United States Patent
Theimer et al.

(10) Patent No.: US 9,202,510 B2
(45) Date of Patent: *Dec. 1, 2015

(54) VIBRATION CANCELLATION FOR DATA STORAGE

(71) Applicant: Amazon Technologies, Inc., Reno, NV (US)

(72) Inventors: Marvin Michael Theimer, Bellevue, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,301

(22) Filed: Mar. 9, 2015

(65) Prior Publication Data

US 2015/0179211 A1    Jun. 25, 2015

Related U.S. Application Data

(63) Continuation of application No. 14/216,343, filed on Mar. 17, 2014, now Pat. No. 8,976,472, which is a continuation of application No. 13/074,992, filed on Mar. 29, 2011, now Pat. No. 8,681,440.

(51) Int. Cl.

| | |
|---|---|
| G11B 5/09 | (2006.01) |
| G11B 19/04 | (2006.01) |
| G11B 5/012 | (2006.01) |
| G11B 20/10 | (2006.01) |
| G11B 5/55 | (2006.01) |
| G11B 19/20 | (2006.01) |
| G11B 33/08 | (2006.01) |

(52) U.S. Cl.
CPC ............ *G11B 19/042* (2013.01); *G11B 5/012* (2013.01); *G11B 5/5582* (2013.01); *G11B 19/2018* (2013.01); *G11B 20/10009* (2013.01); *G11B 33/08* (2013.01)

(58) Field of Classification Search
None
See application file for complete search history.

(56) References Cited

U.S. PATENT DOCUMENTS

| 6,424,606 B1 | 7/2002 | Okazaki et al. |
| 6,496,320 B1 | 12/2002 | Liu |
| 6,952,318 B1 | 10/2005 | Ngo |
| 8,681,440 B1 | 3/2014 | Theimer et al. |
| 8,976,472 B1 | 3/2015 | Theimer et al. |
| 2003/0112547 A1 | 6/2003 | Koso et al. |

OTHER PUBLICATIONS

Hernandez, Daniel et al.; Dual-Stage Track-Following Servo Design for Hard Disk Drives; Department of Mechanical Engineering University of California, Berkeley, CA; Proceedings of the American Control Conference San Diego, California, pp. 4116-4121, Jun. 1999.

Soeno, Y et al.; Piezoelectric Piggy-Bank Microactuator for Hard Disk Drive; Magnetics, IEEE Transactions, vol. 35, Issue:2; pp. 983-987, Mar. 1999.

Koganezawa, S et al.; Dual-Stage Actuator System for Magnetic Disk Drives Using a Shear Mode Piezoelectric Microactuator; Magnetics, IEEE Transactions, vol. 35, Issue:2; pp. 988-992, Mar. 1999.

*Primary Examiner* — Muhammad N Edun

(74) *Attorney, Agent, or Firm* — Robert C. Kowert; Meyertons, Hood, Kivlin, Kowert & Goetzel, P.C.

(57) ABSTRACT

Methods and apparatus for vibration cancellation are disclosed. Vibration data from one or more vibration detectors associated with a storage device is collected. The vibration data represents vibrations experienced by the storage device. In response to the vibration data from the one or more vibration detectors, one or more movements for respective ones of one or more counter-vibration actuators to at least partially cancel of the vibrations experienced by the storage device is calculated. The one or more counter-vibration actuators perform the one or more movements.

26 Claims, 13 Drawing Sheets

VIBRATION CANCELLATION FOR DATA STORAGE

This application is a continuation of U.S. application Ser. No. 14/216,343, filed Mar. 17, 2014, now U.S. Pat. No. 8,976,472, which is a continuation of U.S. application Ser. No. 13/074,992, filed Mar. 29, 2011, now U.S. Pat. No. 8,681,440, which are hereby incorporated by reference in their entireties.

BACKGROUND

Many modern storage systems include storage devices that store data on magnetic or optical storage media. For example, common hard disk drives include one or more disks and a disk controller to manage local operations concerning the disks and process instructions from systems using the disks. Analogous control architectures exist in optical storage media. The disks themselves in a hard disk drive (HDD) are usually made of an aluminum alloy or a mixture of glass and ceramic, and are covered with a magnetic coating. Typically, two or more disks are stacked vertically on a common spindle that is turned by a disk drive motor at several thousand revolutions per minute (rpm). An actuator assembly supports a movable set of read/write heads for reading data from or writing data to the disks.

In normal operation, the head flies over the surface of the disk at a vertical height on the order of 2 millionths of an inch. The microscopic distance between the recording surface and the read/write head leaves little tolerance for vertical misalignment. Even very small angular misalignments of components resulting from vibration can cause the head to come in contact with the recording surface. Such physical contact may cause the head to generate contacts on the disk surface that may lead to a head-disk crash. This renders the disk inoperable and destroys any data stored on the recording surface. Likewise, horizontal misalignment due to vibration can throw a head off-track and cause delay while an actuator repositions to accommodate the change in alignment.

Disk drive components, such as fans, actuators for moving heads, and motors for turning disks, generate vibration and are subject to vibrations within their environment. Vibration-related problems are particularly acute as drives become increasingly compact and are used in multi-drive systems. As drives become more compact, tolerance for vibration-related misalignment decreases. As drives are used in multi-drive systems, the drives tend to be installed in proximity to each other, in arrays, such that vibrations created in a first disk can create adverse results in a second disk.

Figure 1:
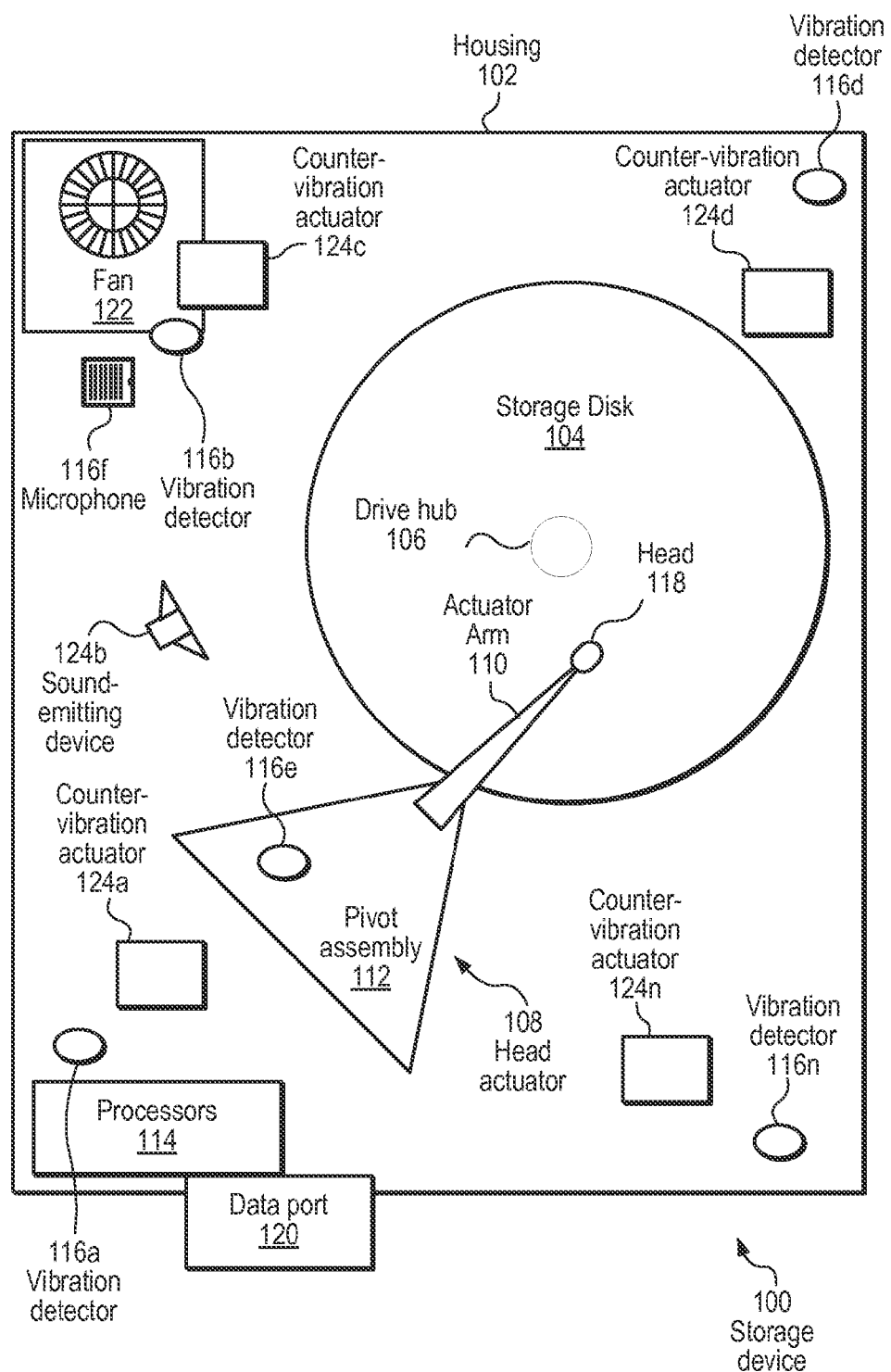
FIG. 1 illustrates a high-level schematic representation of a top view of a disk drive equipped with vibration cancellation devices for use in data center storage racks.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for implementing vibration cancellation for storage devices are described. In some embodiments, vibration data from one or more vibration detectors associated with a storage device is collected. As used herein, a storage device refers to any configuration of non-transitory storage media used for storing data. In response to the vibration data from the one or more vibration detectors, one or more movements for respective ones of one or more counter-vibration actuators to at least partially cancel of the vibrations experienced by the storage device is calculated. The one or more counter-vibration actuators perform the one or more movements.

In some embodiments, storage disks are mounted within a housing of a storage device. Heads, mounted within the housing, read data from or write data to respective ones of the storage disks under control of a processor. In some embodiments, the disks include optical storage disks. In some embodiments, the disks include magnetic storage disks.

Vibration detectors are associated with the storage device. Counter-vibration actuators are also associated with the storage device. Processors associated with the storage device are configured to receive vibration data from the vibration detectors. In response the vibration data from the vibration detectors, the processors calculate movements for respective ones of the counter-vibration actuators to at least partially cancel of the vibrations experienced by the storage device, and cause the counter-vibration actuators to perform the respective movements.

In some embodiments, a vibration-cancellation actuator, also called a counter-vibration actuator emits a vibration approximating the same amplitude but with inverted phase (also known as antiphase) to at least a portion of the vibration intended to be cancelled. The vibration intended to be cancelled combines with the vibration generated by the counter-vibration actuator to form a new vibration, in a process called interference. In some embodiments, the vibration intended to be cancelled combines with the vibration generated by the counter-vibration actuator at least partially cancel each other out in an effect called phase cancellation. In some embodiments, depending on the circumstances and the methods used, significant portions of the vibration to be cancelled are attenuated.

A counter-vibration actuator may be co-located with a vibration source to be attenuated. In such an embodiment, the counter-vibration actuator may emit a vibration of amplitude equal to the source of the unwanted vibration. Alternatively, the transducer (e.g., counter-vibration actuator) emitting the cancellation signal may be located at the location where vibration attenuation is desired (e.g. at a particular storage device component requiring vibration protection). Such an environment allows much lower vibration emission by counter-vibration actuators to be effective. Vibration cancellation at other locations is more difficult, as the three dimensional wavefronts of the unwanted vibration and the cancellation signal may match and create alternating zones of constructive and destructive interference. In small enclosed spaces (e.g. the interior of a storage device case) embodiments achieve some global cancellation via multiple counter-vibration actuators and feedback vibration detectors, and measurement of the modal responses of the enclosure.

Some embodiments achieve vibration control through the use of computer processors, which may be integrated with or separate from a storage device and which, when integrated with the storage device, may be integrated with or separate from the processors used to control other storage device functions. The processors analyze the waveform of existing vibrations to be attenuated and generate signals including reversed waveforms to cancel the unwanted vibrations by interference. In some embodiments, the movements of the counter-vibration actuator are calculated to generate vibrations with identical or directly proportional amplitude to the waveform of the original vibration, but forming an inverted signal. The generated vibrations create destructive interference that reduces the amplitude of the vibration experienced by components of the storage device that are protected by the embodiments.

Disk-Level Embodiments

FIG. 1 illustrates a high-level schematic representation of a top view of a disk drive equipped with vibration cancellation devices for use in data center storage racks. In the example embodiment of FIG. 1, many components are omitted for the sake of simplicity in communication of the embodiment. Likewise, some components shown as separate entities in FIG. 1 will, in various embodiments, be combined. Additionally, some embodiments will include additional components and omit entirely some of the components described with respect to FIG. 1.

In the example embodiment of FIG. 1, a storage device 100 of FIG. 1 is a magnetic data storage and retrieval system with an outer casting, base or housing 102 containing a plurality of stacked, parallel magnetic storage disks 104 (one shown), which are closely spaced apart. Storage disks 104 are rotated by a spindle motor (not shown) located below disks 104 about a central drive hub 106. A head actuator 108 comprises a plurality of stacked, parallel actuator arms 110 (one shown) in the form of a comb that is pivotally mounted to housing 102 about a pivot assembly 112. Moving components of storage device 100 include but are not limited to magnetic storage disks 104, spindle motor, head actuator 108, and head 118, each of which may generate vibrations. Processors 114 are also mounted to the housing 102 for controlling functions of storage device 100, including selectively moving the comb of actuator arms 110 relative to disks 104. Processors 114 monitor and provide command inputs to head actuator 108, among other functions, and are variously logically or physically connected to other components of storage device 100 that operate under their control.

In the embodiment shown, each arm 110 has extending from it at least one magnetic read/write transducer or head 118 mounted to a flexure that is flexibly mounted to each actuator arm 110. Read/write heads 118 magnetically read data from and/or magnetically write data to disks 104. A level of integration called a head gimbal assembly comprises head 118 mounted on a suspension (not shown) of actuator arm 110. Suspensions have a spring-like quality which biases or maintains them in parallel relationship relative to one another. A motor (not shown) housed within or attached to pivot assembly 112 is also mounted to the arms 110 opposite head gimbal assemblies. Movement of an actuator coil assembly (not shown) within pivot assembly 112 moves the head gimbal assemblies substantially radially across tracks on the disks 104 until the heads 118 settle on the target tracks.

Processors 114 will typically include a closed-loop actuator servo control system for positioning the actuator and the read/write transducers to specified storage track locations on the data storage disk. During normal data storage system operation, a servo transducer, generally mounted proximate to the read/write transducers in the head 118, or, alternatively, incorporated as part of the read element of the transducer in the head, is typically employed to read information for the purpose of following a specified track (track following) and seeking specified track and data sector locations on the disk (track seeking).

Processors 114 receive data read from heads 118 and communicate the data to an external system through a data port 120, such as a SCSI (Small Computer System Interface) connection. Processors 114 further receive data from data port 120 for writing by heads 118 onto disks 114. Processors 114 further receive commands from and send data to external systems (not shown), which will vary from embodiment to embodiment, using data port 120. In some embodiments, such external systems may include coordinator nodes, as described below.

Additionally, processors control a fan 122 used to move air through storage device 100 for the purpose of removing heat from within storage device 100. A temperature sensor (not shown) can send data to processors 114, on the basis of which processors 114 can be programmed to activate, adjust the speed of, or de-activate fan 122. Processors 114 also receive vibration data collected by vibration detectors 116a-116n. The vibration data represents vibrations experienced by storage device 100. Vibrations may be of any frequency and may include both transient and recurring components. Such vibrations may further include both pressure waves and mechanical oscillations about an equilibrium position, without regard to whether motion embodying the vibration is periodic or random.

Types and configurations of vibration detectors used in embodiments of the invention will vary between embodiments, and multiple types and configurations of vibration detector may be used within a particular embodiment. In the embodiment portrayed in FIG. 1, each of vibration detectors 116a-116n is shown internal to housing 102. In some embodiments, such vibration detectors 116a-116n may be associated with storage device 100 through direct physical connection to processors 114. In alternative embodiments, such as the embodiment described below with respect to FIG. 2, vibration detectors may be mounted external to the storage device and may be associated with storage device through direct physical connection to processors. In further alternative embodiments, such as the embodiment described below with respect to FIG. 3, vibration detectors may be located external to the storage device and may be associated with storage device through a logical connection to processors, such as over a network or through a radio frequency connection. Some embodiments will use multiple ones of the above-described vibration detector configurations without departing from the scope and intent of the present disclosure.

Types of vibration detectors will vary between embodiments, and one of skill in the art will readily realize in light of having read the present disclosure that any suitable vibration detector technology may be used without departing from the scope and intent of the present disclosure. Examples of vibration detectors include gyroscopes, accelerometers, magnetic displacement detectors, and reflection-based movement detectors, which may themselves employ vibrations or electromagnetic waves reflected off of a surface to measure changes in the distance between objects. Some embodiments will employ multiple types of vibration detectors, for instance using piezoelectric gyroscopes and accelerometers as internal vibration detectors and infra-red reflection-based movement detectors for vibration detection outside of a storage device. Alternatively, MEMS (microelectromechanical systems) microphones, accelerometers and gyroscopes may be used as vibration detectors. Vibration detectors may be integrated into a storage device, integrated into a rack housing a storage device, or housed in a free-standing mounting.

In one embodiment, in response to the vibration data from vibration detectors 116a-116n, processors 114 calculate movements for respective ones counter-vibration actuators 124a-124n to at least partially cancel of the vibrations experienced by the storage device 100. Processors cause counter-vibration actuators 124a-124n to perform the one or more movements. Additionally, processors 114 can be programmed to activate, adjust the speed of, or de-activate fan 122 in response to vibration data. In some embodiments, a coordinator node can command processors 114 to activate, adjust the speed of, or de-activate fan 122 in response to vibrations experienced by storage devices external to the storage device housing fan 122.

In some embodiments, a vibration detector 116b is attached to a known vibration-generating component of the storage device 100, such as fan 122, for the purpose of measuring vibration experienced by storage device 100 at or near the source of a particular vibration and sending resulting vibration data to processors 114. Likewise, a vibration detector 116e is attached to pivot assembly 112 for the purpose of measuring vibrations experienced at or near a part of storage device 100 which exhibits a particular sensitivity to vibrations and sending resulting vibration data to processors 114. Additional vibration detectors, such as vibration detector 116a, vibration detector 116n, and vibration detector 116d are included in storage device 100 for the purpose of measuring vibrations experienced at various points on storage device 100 and sending resulting vibration data to processors 114. Additional external vibration detectors (not shown) are likewise able to measure vibrations arriving from sources external to storage device 100 and sending resulting vibration data to processors 114.

The frequency of vibration measured by vibration detectors will vary between embodiments and between vibration detectors 116a-116n. Specialized vibration detectors, such as a microphone 116f, can be used to measure vibrations at particular frequencies and sending resulting vibration data to processors 114. Microphone 116f is, in one embodiment, a vibration detector designed to measure vibrations in the audible frequency range (e.g., 20 Hz to 20 kHz) and send resulting vibration data to processors 114.

Storage device 100 further includes a set of counter-vibration actuators 124a-124n. Counter-vibration actuators 124a-124n perform movements, under the control of processors 114, to at least partially cancel the vibrations experienced by storage device 100. In some embodiments, a counter-vibration actuator 124c is attached to a known vibration-generating component of the storage device 100, such as fan 122, for the purpose of at least partially cancelling vibration experienced by storage device 100 at or near the source of a particular vibration and sending resulting vibration data to processors 124. Additional counter-vibration actuators, such as counter-vibration actuator 124a, counter-vibration actuator 124n, and counter-vibration actuator 124d are included in storage device 100 for the purpose of at least partially cancelling the vibrations experienced by storage device 100 at various points on storage device 100 under the control of processors 114. Additional external counter-vibration actuator (not shown) are likewise able to at least partially cancel the vibrations experienced by storage device 100 arriving from sources external to storage device 100 under the control of processors 114.

Counter-vibration actuators 124a-124n will vary between embodiments and may exist in heterogeneous sets within a single storage device 100 or a system of storage devices. Examples of counter-vibration actuators 124a-124n may include linear magnetic actuators, such as auditory speakers, rotary electromagnetic actuators such as small motors with weights attached, piezoelectric actuators, or MEMS actuators. Some embodiments will employ multiple types of counter-vibration actuators 124a-124n.

Configurations of actuators may also vary between embodiments. In the example embodiment depicted in FIG. 1, counter-vibration actuators 124a-124n are housed within housing 102 of storage device 100 and associated with storage device 100 by means of physical attachment to processors 114. In alternative embodiments, such as the embodiment described below with respect to FIG. 2, counter-vibration actuators may be mounted external to the storage device and may be associated with storage device through direct physical connection to processors. In further alternative embodiments, such as the embodiment described below with respect to FIG. 3, counter-vibration actuators may be located external to the storage device and may be associated with storage device through a logical connection to processors, such as over a network or through a radio frequency connection. Some embodiments will use multiple ones of the above-described counter-vibration actuators configurations without departing from the scope and intent of the present disclosure.

The frequency of vibration generated by counter-vibration actuators will vary between embodiments and between vibration detectors 124a-124n. Specialized counter-vibration actuators, such as a sound-emitting device 124b, can be used to generate vibrations at particular frequencies under the control of processors 114. Sound-emitting device 124b is, in one embodiment, a speaker or other actuator designed to emit vibrations in the audible frequency range (e.g., 20 Hz to 20 kHz) under the control of processors 114. In some embodiment, some of counter-vibration actuators 124a-124n may be configured to produce vibrations calculated to cancel a dynamic component of a vibration experienced by storage device 100, while others of counter-vibration actuators 124a-124n may be configured to produce vibrations calculated to cancel a recurring component of a vibration experienced by storage devices 302a-302d.

Figure 2:
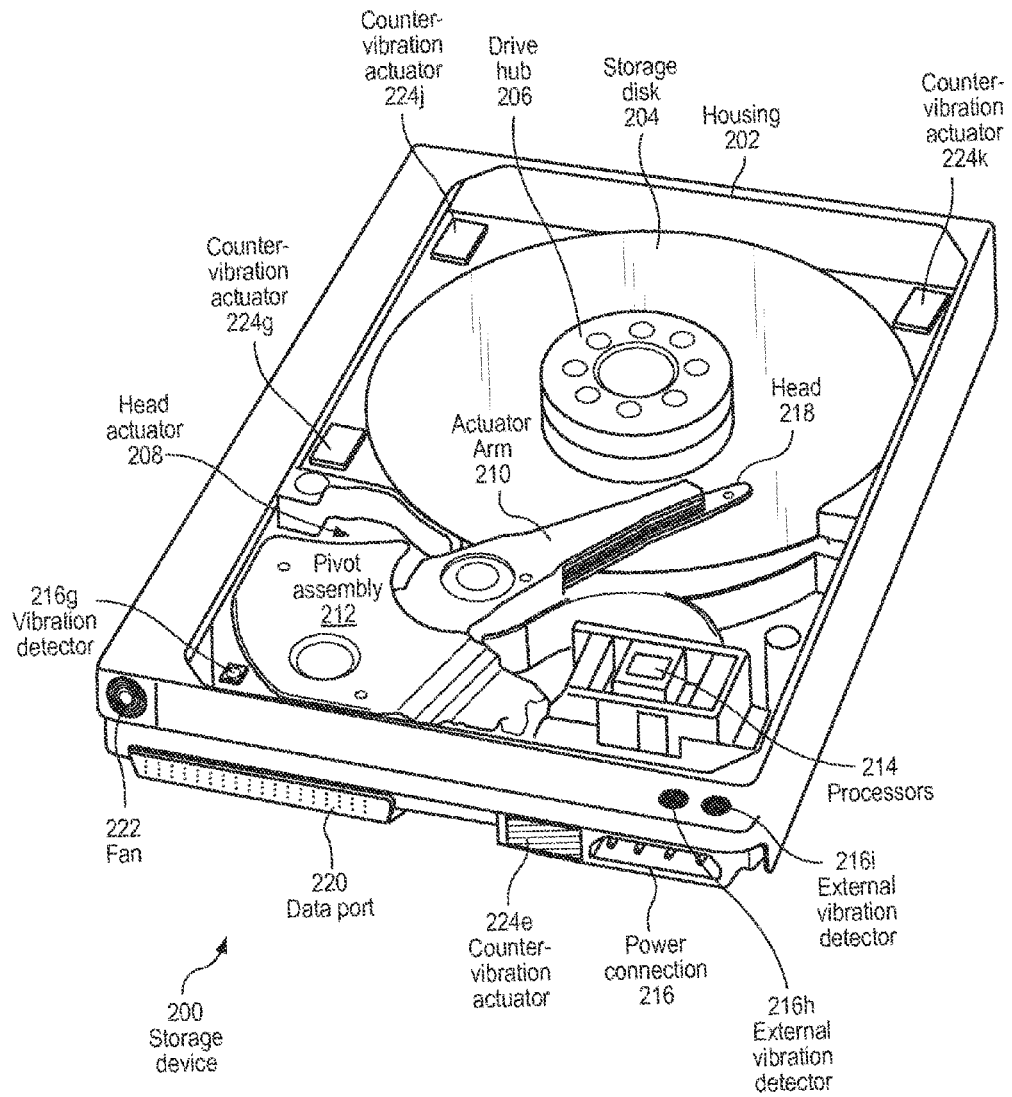
FIG. 2 depicts a perspective view of a disk drive equipped with vibration cancellation devices for use in data center storage racks.

FIG. 2 depicts a perspective view of a disk drive equipped with vibration cancellation devices for use in data center storage racks. In the example embodiment of FIG. 2, many components are omitted for the sake of simplicity in communication of the embodiment. An example of such omitted components that would be present in a physical embodiment is a set of wires connecting a processor to various components, such as counter-vibration actuators and vibration detectors. Likewise, some components shown as separate entities in FIG. 2 will, in various embodiments, be combined. Additionally, some embodiments will include additional components and omit entirely some of the components described with respect to FIG. 2.

In the example embodiment of FIG. 2, a storage device 200 of FIG. 2 is a magnetic data storage and retrieval system with an outer casting, base or housing 202 containing a plurality of stacked, parallel magnetic storage disks 204 (one shown), which are closely spaced apart. Storage disks 204 are rotated by a spindle motor (not shown) located below disks 204 about a central drive hub 206. A head actuator 208 comprises a plurality of stacked, parallel actuator arms 210 (one shown) in the form of a comb that is pivotally mounted to housing 202 about a pivot assembly 212. Processors 214 are also mounted to the housing 202 for controlling functions of storage device 200, including selectively moving the comb of actuator arms 210 relative to disks 204. Processors 214 monitor and provide command inputs to head actuator 208, among other functions.

In the embodiment shown, each arm 210 has extending from it at least one magnetic read/write transducer or head 218 mounted to a flexure that is flexibly mounted to each actuator arm 210. Read/write heads 218 magnetically read data from and/or magnetically write data to disks 204. Processors 214 receive data read from heads 218 and communicate the data to an external system through a data port 220, such as a SCSI (Small Computer System Interface) connection. Processors 214 further receive data from data port 220 for writing by heads 218 onto disks 204. Processors 214 further receive commands from and send data to external systems (not shown), which will vary from embodiment to embodiment, using data port 220. In some embodiments, such external systems may include coordinator nodes, as described below.

Additionally, processors control a fan 222 used to move air through storage device 200 for the purpose of removing heat from within storage device 200. Processors 214 also receive vibration data collected by vibration detectors 216g-216i. The vibration data represents vibrations experienced by storage device 200. In one embodiment, in response to the vibration data from vibration detectors 216g-216i, processors 214 calculate movements for respective ones counter-vibration actuators 224e-224k to at least partially cancel of the vibrations experienced by the storage device 200. Processors cause counter-vibration actuators 224e-224k to perform the one or more movements.

In some embodiments, a vibration detector 216g is located near to a known vibration-generating component of the storage device 200, such as fan 212, for the purpose of measuring vibration experienced by storage device 200 at or near the source of a particular vibration and sending resulting vibration data to processors 214. Additional vibration detectors, such as vibration detector 216h and vibration detector 116i are included in storage device 200 for the purpose of measuring vibrations experienced at various points on storage device 200 and sending resulting vibration data to processors 214. Additional external vibration detectors 216h-216l are able to measure vibrations arriving from sources external to storage device 200 and send resulting vibration data to processors 214. In one embodiment, vibration detector 216h is a microphone and vibration detector 116i is an reflection-based infrared movement sensor.

The frequency of vibration measured by vibration detectors will vary between embodiments and between vibration detectors 216h-216i. In one embodiment, vibration detector 216h can be used to measure vibrations in the audible frequency range (e.g., 20 Hz to 20 kHz) and send resulting vibration data to processors 214. By contrast, vibration detector 216i can be designed for particular sensitivity to can be used to measure low-frequency vibrations below 20 Hz and send resulting vibration data to processors 214.

Storage device 200 further includes a set of counter-vibration actuators 224e-224k. Counter-vibration actuators 224e-124k perform movements, under the control of processors 214, to at least partially cancel the vibrations experienced by storage device 200. External counter-vibration actuator 224e is designed to at least partially cancel under the control of processors 214 the vibrations experienced by storage device 200 arriving from sources external to storage device 200.

Rack-Level Embodiments

Figure 3:
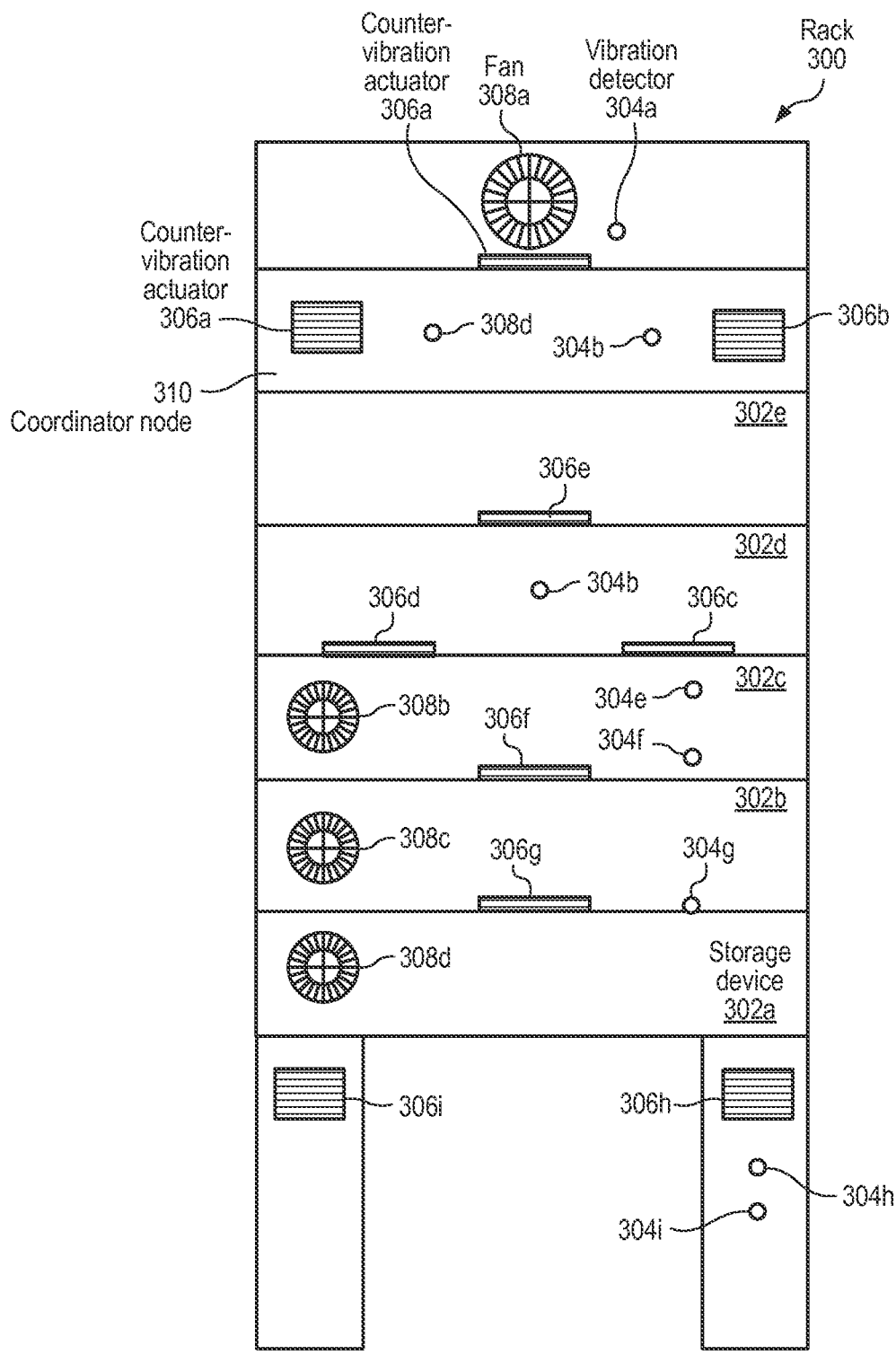
FIG. 3 illustrates a high-level schematic representation of a rack of disk drives equipped with vibration cancellation devices.

FIG. 3 illustrates a high-level schematic representation of a rack of disk drives equipped with vibration cancellation devices. In one embodiment, a rack 300 houses and supports an array of storage devices 302a-302d and an optional coordinator node 310. While a coordinator node 310 is included in the example embodiment described with respect to FIG. 3, one of ordinary skill in the art will readily conclude, in light of having read the present disclosure, that individual storage devices may autonomously act to execute vibration cancellation techniques using devices described herein or may act in concert with or without example coordinator node 310.

Rack 300 is illustrated with examples of several configurations of hardware including coordinator node 310 and variously including different combinations of vibration detectors 304a-304i, fans 308a-308d, and counter-vibration actuators 306a-306i associated with various storage devices 302a-302d. The particular combinations of hardware including coordinator node 310, vibration detectors 304a-304i, fans 308a-308d, and counter-vibration actuators 306a-306i will vary between embodiments and configurations without departing from the scope of the present disclosure. Thus, some embodiments may include configurations supporting all of the components shown in FIG. 3, while other embodiments will include configurations supporting only subsets of the components shown in FIG. 3 while still remaining within the scope and intent of the present disclosure.

Some embodiments support rack-level vibration cancellation through hardware such as a coordinator node 310 and rack mounted counter-vibration actuators 306f-306i and rack-mounted vibration detectors 304g-304i. In such embodiments, coordinator node 310, which may be a storage device similar to storage devices 302a-302d or may be a dedicated rack-operations coordination node, may control rack mounted counter-vibration actuators 306f-306i and may receive data from rack-mounted vibration detectors 304g-304i. Additionally, some embodiments will support control by coordinator node 310 of counter-vibration actuators associated with specific storage devices 302a-302d, including both external counter-vibration actuators 304c-304e and counter-vibration actuators internal to specific storage devices 302a-302d, while other embodiments will allow counter-vibration actuators associated with specific storage devices 302a-302d to operate autonomously. Likewise, some embodiments will support gathering of vibration data from vibration detectors 304d-304f associated with specific storage devices 302a-302d, including those vibration detectors 304d-304f internal to or external to and integrated with storage devices 302a-302d. Further, some embodiments will support the receipt by coordinator node 310 of warning and diagnostic data from storage devices 302a-302d and some embodiments will allow coordinator node 310 to provide warning and diagnostic data to storage devices 302a-302d or to send instructions to internal components of storage devices 302a-302d, such as commands to shut down a fan within one of storage devices 302a-302d or disable one of storage devices 302a-302d due to vibrations emanating from the selected one of storage devices 302a-302d.

As discussed herein in the present disclosure, any vibration detector or counter-vibration may be said to be "associated with" a particular storage device or coordinator node or rack if the vibration detector or counter-vibration actuator provides data to or receives instruction from, respectively, that storage device, coordinator node, or rack, or, in the case of a counter-vibration actuator, if the counter-vibration actuator cancels a vibration that would otherwise be experienced by the storage device, coordinator node, or rack.

In the example embodiment portrayed in FIG. 3, rack 300 supports a fan 308a for providing removal of thermal energy from storage devices 302a-302d. In some embodiments, ventilation ducts (not shown) may be provided to the back of rack 300. Fan unit 308a may operate under the control of coordinator node 310. Fan 308a is included in a unit with an integrated vibration detector 304a for detecting vibrations created by fan 308a and an integrated counter-vibration actuator 306a for producing vibrations to cancel the vibrations created by fan 308a. In some embodiments, vibration detector 304a may report vibration data to coordinator node 310 and counter-vibration actuator 306a may operate under the control of coordinator node 310. In other embodiments, vibration detector 304a may report vibration data to one or more of storage devices 302a-302d and counter-vibration actuator 306a may operate under the control of one or more of storage devices 302a-302d.

In the example discussed with respect to FIG. 3, coordinator node 310 includes one or more processors (not shown) for controlling one or more of counter-vibration actuators 306a-306h as well as counter-vibration actuators (not shown) internal to one or more of storage devices 302a-302d. In such an embodiment, the processors of coordinator node 310 may receive vibration data from one or more of vibration detectors 304a-304i as well as vibration detectors internal to one or more of storage devices 302a-302d. In such an embodiment, coordinator node may, in response the vibration data from the one or more vibration detectors, calculate one or more movements for respective ones of the one or more counter-vibration actuators to at least partially cancel of the vibrations experienced by the storage device or by the rack, and cause the one or more counter-vibration actuators to perform the respective one or more movements.

In some embodiments, counter-vibration actuator 306a may produce vibrations at a frequency greater than those produced by counter vibration actuator 306b. In one embodiment, counter-vibration actuator 306a may be configured to produce vibrations calculated to cancel a transient component of a vibration experienced by storage devices 302a-302d, while counter-vibration actuator 306b may be configured to produce vibrations calculated to cancel a recurring component of a vibration experienced by storage devices 302a-302d.

Storage device 302e is equipped with a counter vibration actuator 306e embodied as a removable adapter for mounting storage device 302e to rack 300. In some embodiments, counter vibration actuator 306e may be controlled by and connected to, either logically using wired or wireless networks or physically using a wire connection, storage device 302e. In alternative embodiments, counter vibration actuator 306e may be controlled by coordinator node 310.

Storage device 302d is equipped with counter vibration actuators 306c-306d external to and permanently integrated with storage device 302d as mounting hardware for integrating with rack 300 as well as a vibration detector 304d for measuring vibrations experienced by storage device 302d.

Storage device 302c is equipped with a fan 308b and vibration detectors 304e-304f. Additionally, storage device 302c is associated with a counter vibration actuator 306f external to storage device 302c and permanently attached to rack 300. In some embodiments, in spite of the fact that counter vibration actuator 306f is external to storage device 302c and permanently attached to rack 300, counter vibration actuator 306f may configurably be controlled by either coordinator node 310 or storage device 302c.

Storage device 302b is equipped with a fan 308c and associated with a vibration detector 304g. Additionally, storage device 302b is associated with a counter vibration actuator 304g. Both vibration detector 304g and counter vibration actuator 304g are external to storage device 302c and permanently integrated with rack 300 as mounting hardware for storage device 302b. In some embodiments, in spite of the fact that counter vibration actuator 306g is external to storage device 302b and permanently attached to rack 300, counter vibration actuator 306g may configurably be controlled by either coordinator node 310 or storage device 302c. Likewise, in some embodiments, in spite of the fact that vibration detector 304g is external to storage device 302b and vibration detector 304g may be configured to report vibration data to both or either of coordinator node 310 and storage device 302b.

Storage device 302a is equipped with a fan 308d. In some embodiments, storage device 302a may be associated with vibration detectors 304h-304i and counter vibration actuators 306h-306i. In some embodiments, in spite of the fact that counter vibration actuators 306h-306i are external to storage device 302a and permanently attached to rack 300, counter vibration actuators 306h-306i may configurably be controlled by either coordinator node 310 or storage device 302c.

Operations Performed in Implementing Vibration Cancellation for Storage Devices

Figure 4A:
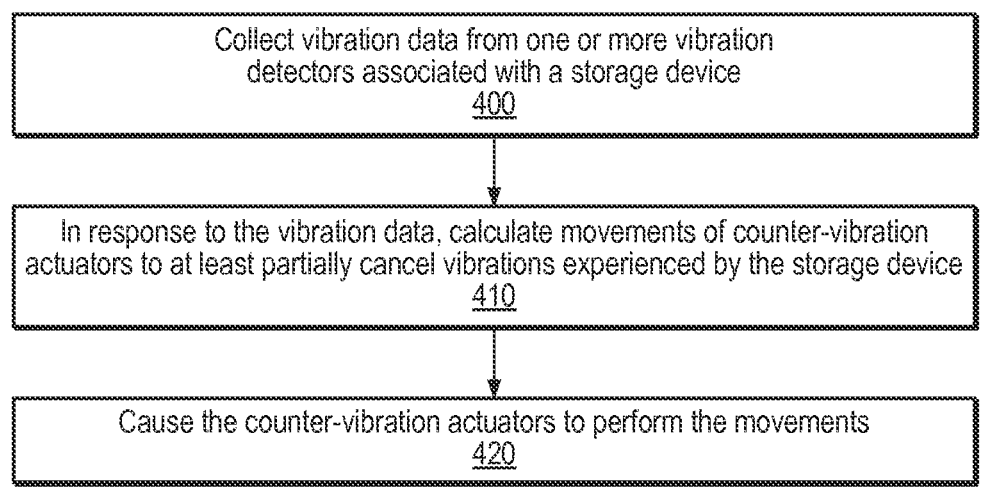
FIG. 4A depicts a high-level logical flowchart of operations performed in implementing vibration cancellation for storage devices.

FIG. 4A depicts a high-level logical flowchart of a operations performed in implementing vibration cancellation for storage devices. Vibration data is collected from one or more vibration detectors associated with a storage device (400). In response to the vibration data, movements of counter-vibration actuators to at least partially cancel vibrations experienced by the storage device are calculated (410). The counter-vibration actuators are caused to perform the movements (420).

Figure 4B:
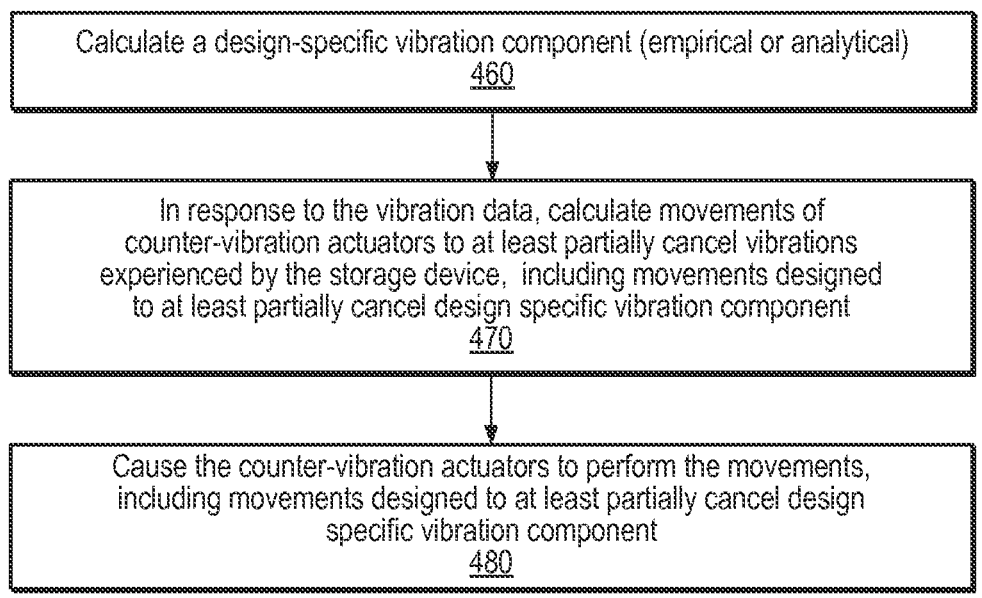
FIG. 4B is a high-level logical flowchart of operations performed in implementing vibration cancellation for design-specific vibration components in data center storage racks.

FIG. 4B is a high-level logical flowchart of a operations performed in implementing vibration cancellation for design-specific vibration components in data center storage racks. A design-specific vibration component is calculated (460). Such a design-specific component may be empirically calculated from experimental data with a particular storage device or may be analytically calculated based on storage device models. In response to vibration data, which may include a design-specific vibration component, movements of counter-vibration actuators to at least partially cancel vibrations experienced by the storage device are calculated (470), including movements designed to at least partially cancel the design specific vibration component. The counter-vibration actuators are caused to perform the movements, including movements designed to at least partially cancel design specific vibration component (480).

Operations Performed in Implementing Vibration Cancellation for Storage Devices Using Position Error Signals Referring briefly to FIG. 1, in some embodiments, storage device 100 is capable of calculating a position error between the expected position of head 118 over disk 104 and the actual position of head 118 over disk 104. In such embodiments, disk 104 generally includes a servo information field (not shown), at least a portion of which is divided into servo patterns. The servo field patterns are read by the read head 118 and induced readback signals are demodulated by processors 114 and used for positioning read head 114. As read head 118 passes over the servo information field, two readback signals $e_a$ and $e_b$ are induced by the servo pattern. The induced readback signals $e_a$ and $e_b$ are then demodulated to develop a position error signal (PES), for example, according to the relationship: $PES=(e_b-e_a)/(e_b+e_a)$. The PES signal is provided to processors 114, which in conventional systems moves the read head 118 to maintain the PES signal equal to zero during track following. In some embodiments, as described below, the PES is used as a diagnostic tool in the control by processor 114 of counter-vibration actuators 124a-124n.

Figure 5A:
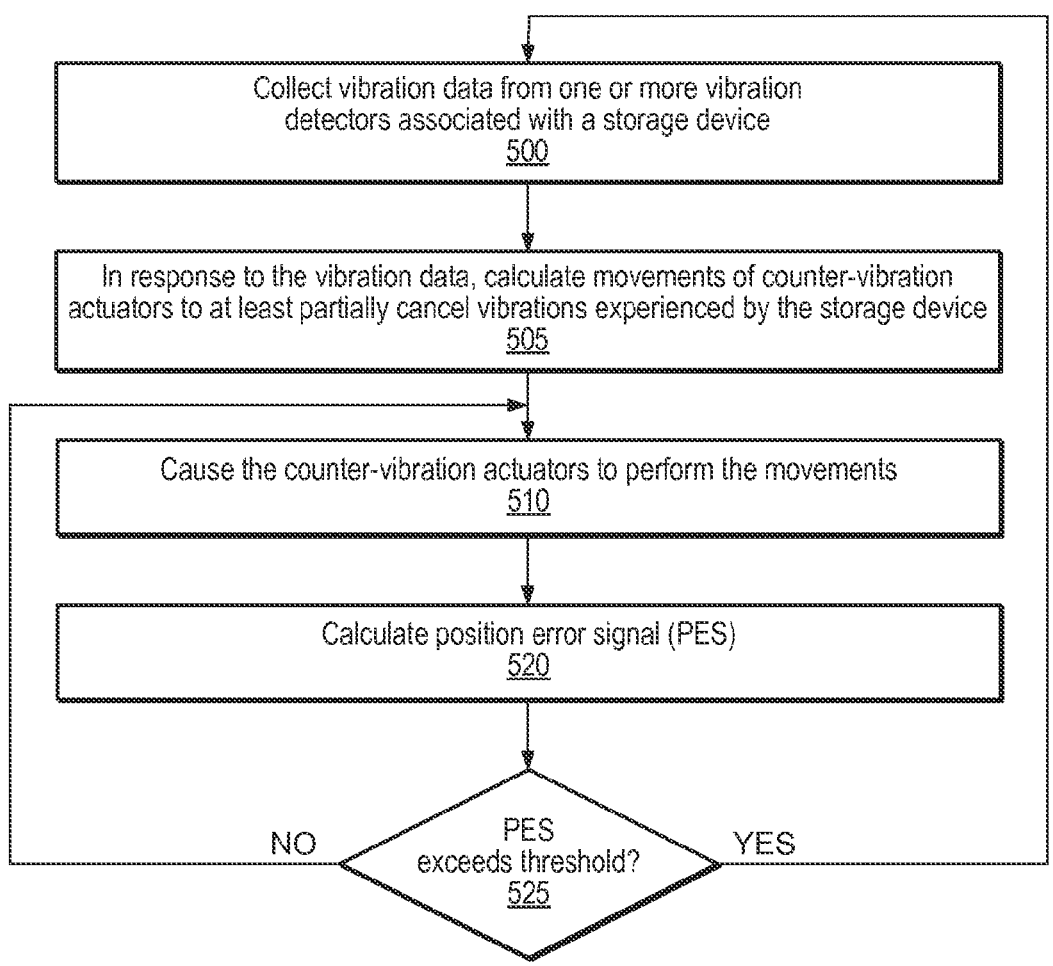
FIG. 5A depicts a high-level logical flowchart of operations performed in managing vibration cancellation through measurement of position error in storage devices.

FIG. 5A depicts a high-level logical flowchart of a operations performed in managing vibration cancellation through measurement of position error in storage devices. Vibration data is collected from one or more vibration detectors associated with a storage device (500). In response to the vibration data, movements of counter-vibration actuators to at least partially cancel vibrations experienced by the storage device are calculated (505). The counter-vibration actuators are caused to perform the movement (510). A position error signal (PES) is calculated (520). A determination is made as to whether the PES exceeds a threshold (525). If the PES exceeds the threshold, the process returns to block (500). If the PES does not exceed the threshold, the process returns to block (510).

Figure 5B:
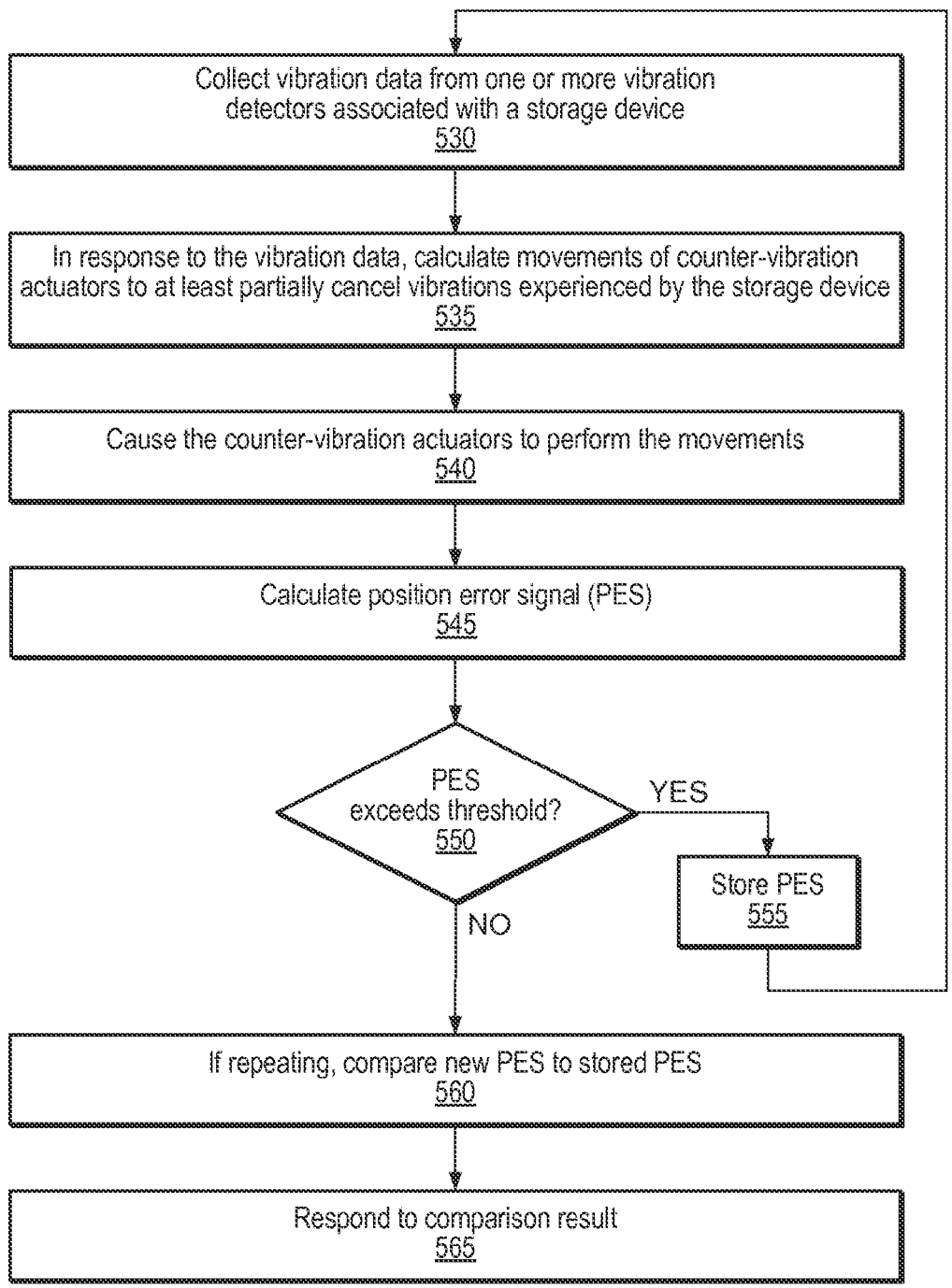
FIG. 5B depicts a high-level logical flowchart of operations performed in managing vibration cancellation through measurement of change in position error in storage devices.

FIG. 5B depicts a high-level logical flowchart of a operations performed in managing vibration cancellation through measurement of change in position error in storage devices. Vibration data from one or more vibration detectors associated with a storage device is collected (530). In response to the vibration data, movements of counter-vibration actuators to at least partially cancel vibrations experienced by the storage device are calculated (535). The counter-vibration actuators are caused to perform the movements (540). A position error signal (PES) is calculated (545). A determination is made as to whether the PES exceeds a threshold (550). If the PES exceeds the threshold, the PES is stored (555). The process then returns to block (530). If the PES does not exceed the threshold, the new value of the PES is compared to the old value of the PES if an old value of the exists (560). A response to the comparison is executed (565).

Responses to such a comparison result will vary between embodiments. In some embodiments, a model of counter-vibration movement calculation may be changed if a PES is shown to increase after a re-calculation of counter-vibration movement. In other embodiments, warning signals may be propagated to a coordinator node or to a server using a particular storage device. Alternatively, a recalculation of movements may be reversed and counter-vibration actuators may be returned to their previous movements. In some embodiments, a disk or a rack may be forced to power-down to prevent damage in response to a comparison showing that a PES increased after a re-calculation of counter-vibration movement. Likewise, control of particular counter-vibration actuators or of storage device components such as fans may be shifted from a coordinator node to a storage device, or vice versa, in response to a comparison showing that a PES increased after a re-calculation of counter-vibration movement. A storage device or coordinator node may likewise apply adaptive learning techniques to modify models of vibration attenuation used to calculate counter-vibration movements in response to a comparison showing that a PES increased or decreased after a re-calculation of counter-vibration movement.

Figure 6A:
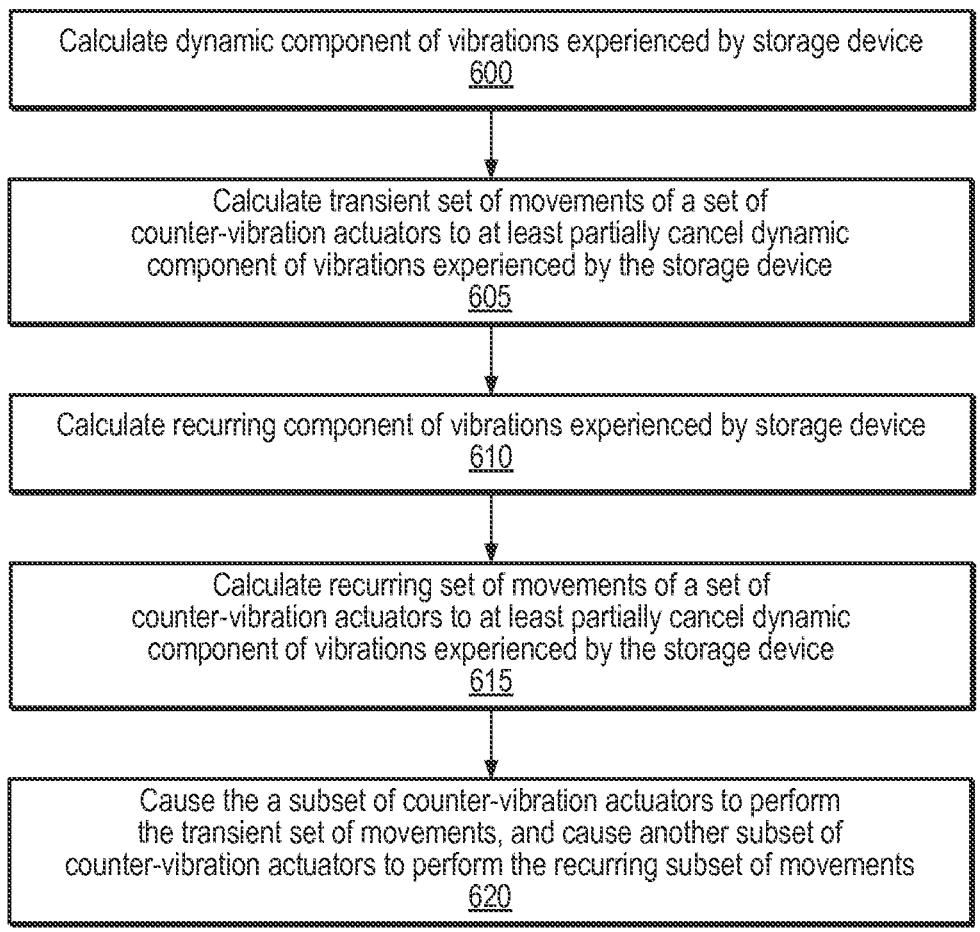
FIG. 6A is a high-level logical flowchart of operations performed in implementing vibration cancellation for transient and dynamic vibration components in data center storage racks.

FIG. 6A is a high-level logical flowchart of a operations performed in implementing vibration cancellation for transient and recurring vibration components in data center storage racks. A dynamic component of vibrations experienced by storage device is calculated (600). A transient set of movements of a set of counter-vibration actuators to at least partially cancel dynamic component of vibrations experienced by the storage device is calculated (605). A recurring component of vibrations experienced by storage device is calculated (610). A recurring set of movements of a set of counter-vibration actuators to at least partially cancel dynamic component of vibrations experienced by the storage device is calculated (615). A subset of counter-vibration actuators is caused to perform the transient set of movements, and cause another subset of counter-vibration actuators to perform the recurring subset of movements (620).

Figure 6B:
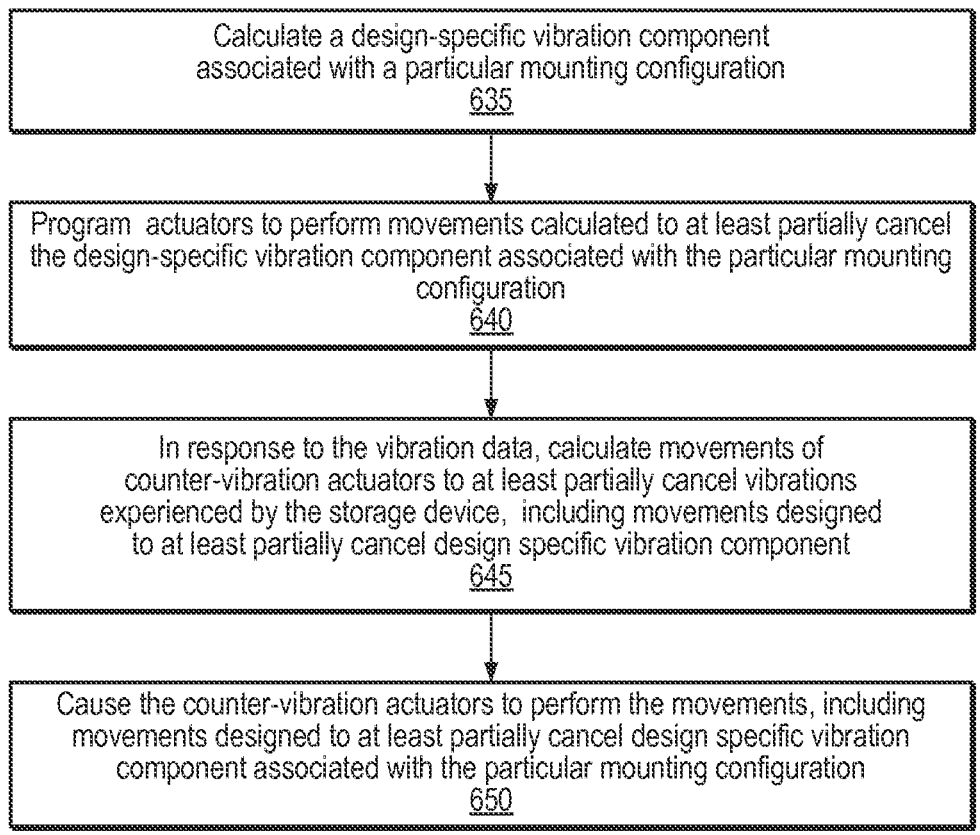
FIG. 6B is a high-level logical flowchart of operations performed in implementing vibration cancellation for vibration components associated with a particular mounting configuration in data center storage racks.

FIG. 6B is a high-level logical flowchart of a operations performed in implementing vibration cancellation for vibration components associated with a particular mounting configuration in data center storage racks. A design-specific vibration component associated with a particular mounting configuration is calculated (635). Actuators are programmed to cause counter-vibration actuators to perform movements calculated to at least partially cancel the design-specific vibration component associated with the particular mounting configuration (640). In response to the vibration data, movements of counter-vibration actuators to at least partially cancel vibrations experienced by the storage device, including movements designed to at least partially cancel design specific vibration component are calculated (645). The counter-vibration actuators are caused to perform the movements, including movements designed to at least partially cancel design specific vibration component associated with the particular mounting configuration (650).

Figure 6C:
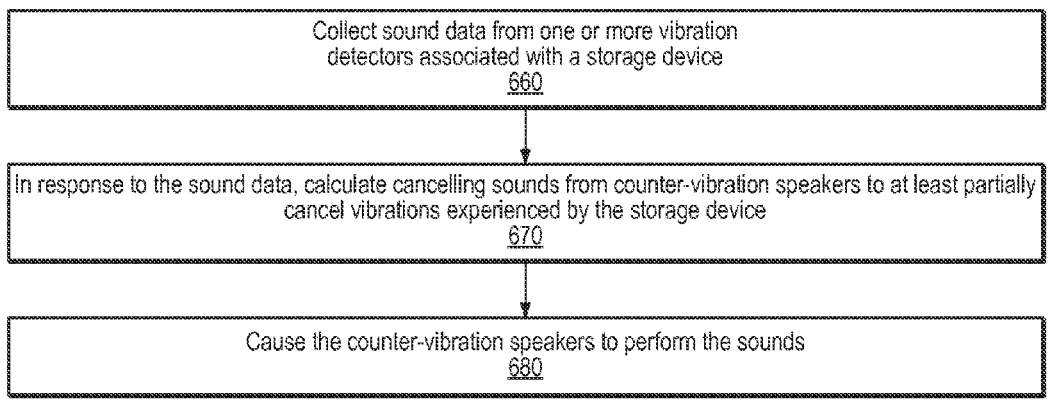
FIG. 6C depicts a high-level logical flowchart of operations performed in implementing vibration cancellation with respect to sounds in data center storage racks.

FIG. 6C depicts a high-level logical flowchart of a operations performed in implementing vibration cancellation with respect to sounds in data center storage racks. Sound data is collected from one or more vibration detectors associated with a storage device (660). In response to the sound data, cancelling sounds from counter-vibration speakers to at least partially cancel vibrations experienced by the storage device are calculated (670). The counter-vibration speakers are caused to emit the sounds (680).

Figure 6D:
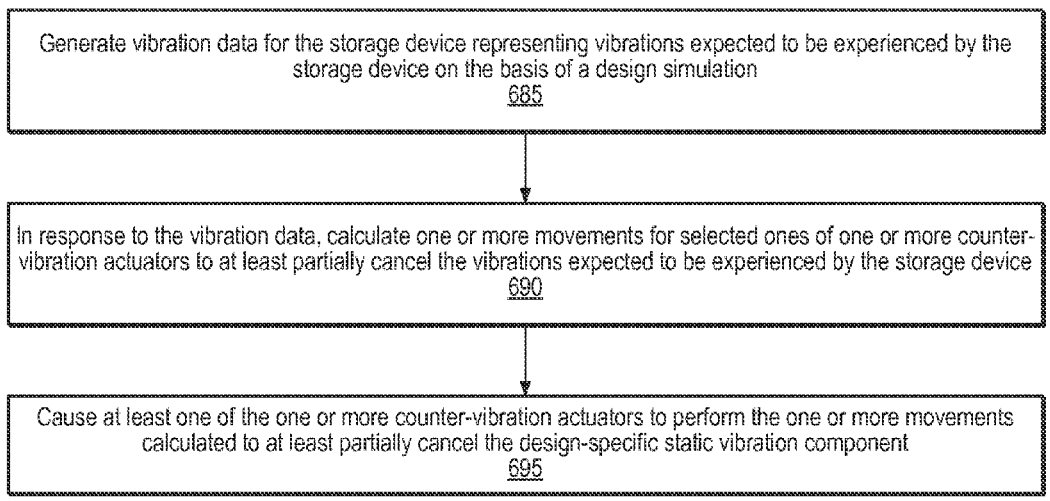
FIG. 6D depicts a high-level logical flowchart of operations performed in implementing vibration cancellation with respect to expected vibrations data derived from a design simulation.

FIG. 6D depicts a high-level logical flowchart of operations performed in implementing vibration cancellation with respect to expected vibrations data derived from a design simulation. Vibration data for the storage device representing vibrations expected to be experienced by the storage device on the basis of a design simulation is generated (685). In some embodiments, the design simulation will include only a design representing a single drive. In other embodiments, the design simulation will include a simulation of a design for a drive or drives mounted in a rack and other environmental data such as ambient vibrations expected in a particular data center. In some embodiments, the simulation will model various material properties of the device using a finite-element model of device components and vibrations experienced by the drive that are generated by the device components.

For example, moving components of a storage device for use in accessing the medium of a storage device may generate vibrations experienced by the storage device. Examples of such moving components of a storage device for use in accessing the medium of a storage device may include a read/write head, an actuator motor for moving the head, and one or more motors used to rotate the storage media. Each such example, among other moving components of the storage device, may generate vibrations experienced by the storage device. In some embodiments, the simulation will model expected vibrations to be experienced by the storage device that are generated by moving components of a storage device for use in accessing the medium of a storage device and may generate vibration data modeling the transmission of those vibrations throughout the components of the device.

In response to the vibration data, one or more movements for selected ones of one or more counter-vibration actuators to at least partially cancel the vibrations expected to be experienced by the storage device is calculated (690). In some embodiments, the movements will be designed to cancel vibrations to be experienced by the storage device that are generated by moving components of a storage device for use in accessing the medium of a storage device. At least one of the one or more counter-vibration actuators is caused to perform the one or more movements calculated to at least partially cancel the design-specific static vibration component (695). In some embodiments, one or more counter-vibration actuators may be pre-programmed based on results of the design simulation or other calculation of expected vibration for the storage device so that during operation the one or more counter-vibration actuators perform the movements calculated to at least partially cancel the modeled or calculated vibrations.

Figure 7A:
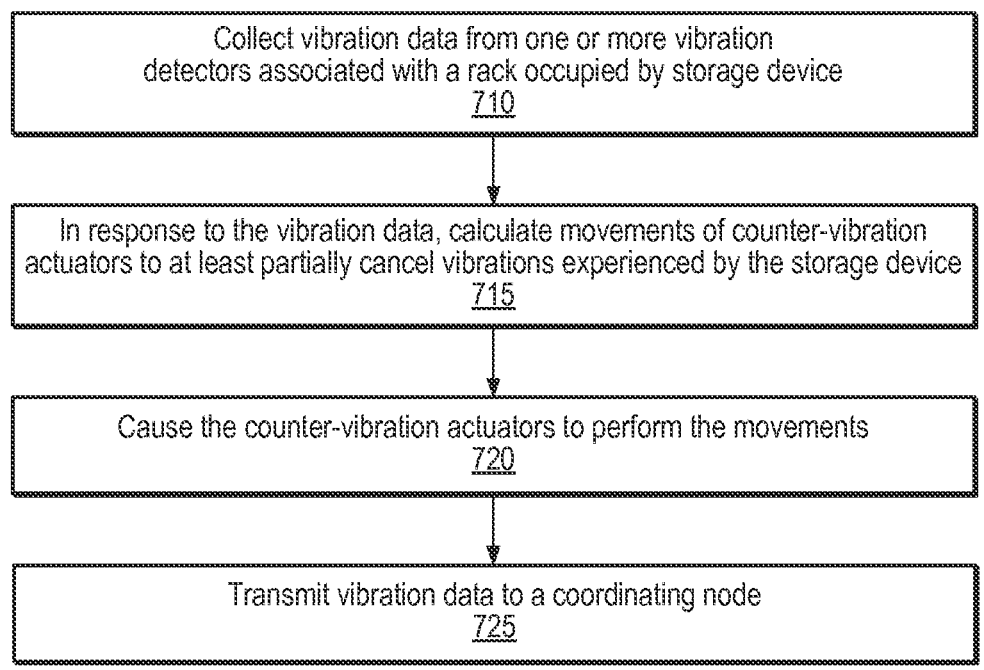
FIG. 7A depicts a high-level logical flowchart of operations performed in implementing vibration cancellation for data center storage racks using a coordinating node.

FIG. 7A depicts a high-level logical flowchart of a operations performed in implementing vibration cancellation for data center storage racks using a coordinating node. Vibration data is collected from one or more vibration detectors associated with a rack occupied by a storage device (710). In response to the vibration data, movements of counter-vibration actuators to at least partially cancel vibrations experienced by the storage device are calculated (715). The counter-vibration actuators are caused to perform the movements (720). The vibration data is transmitted to a coordinating node (725).

Figure 7B:
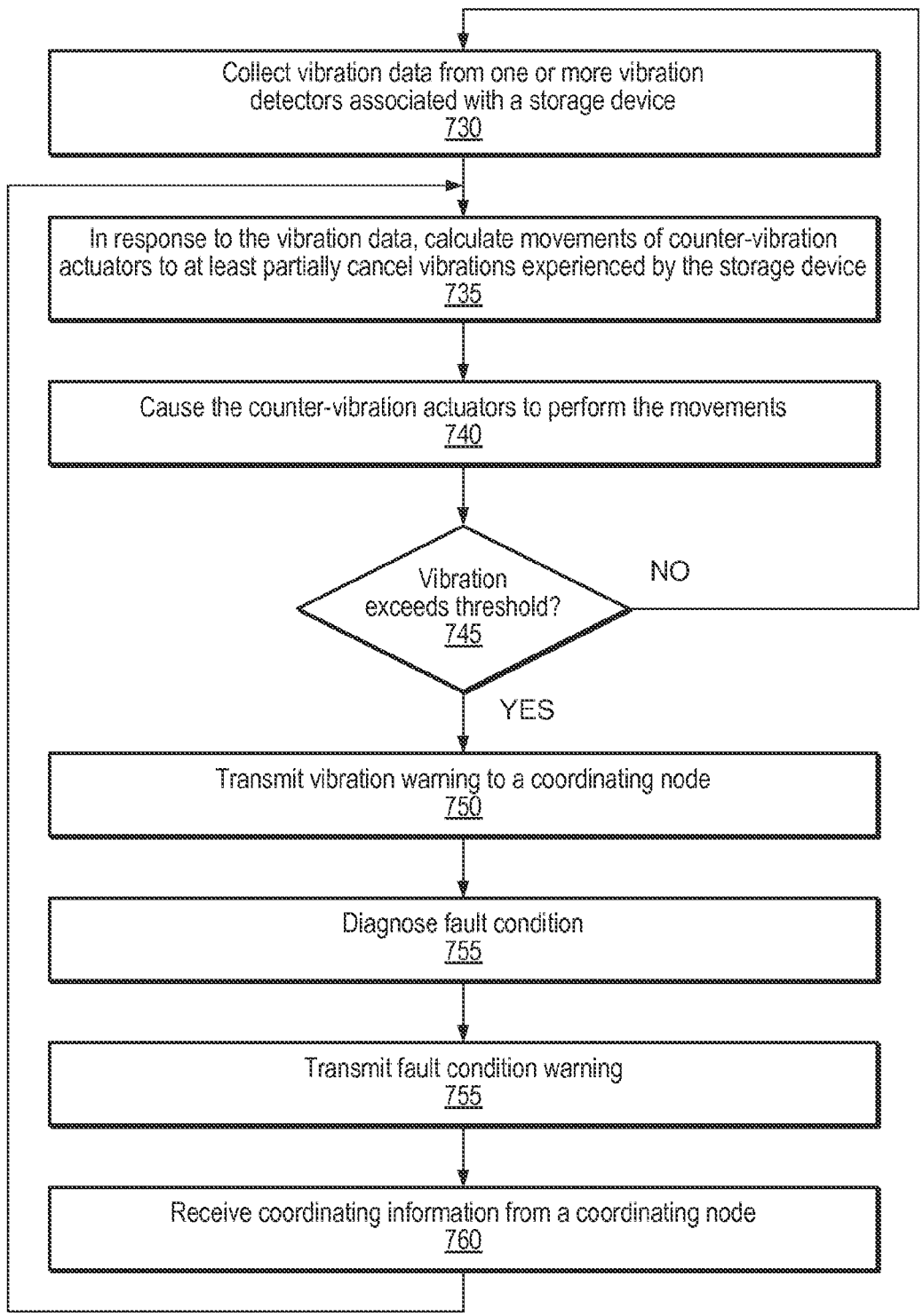
FIG. 7B depicts a high-level logical flowchart of operations performed in implementing vibration cancellation for data center storage racks using a coordinating node and vibration warnings.

FIG. 7B depicts a high-level logical flowchart of a operations performed in implementing vibration cancellation for data center storage racks using a coordinating nodes and vibration warnings. Vibration data from one or more vibration detectors associated with a storage device (730). In response to the vibration data, movements of counter-vibration actuators to at least partially cancel vibrations experienced by the storage device are calculated (735). The counter-vibration actuators are caused to perform the movements (740). A determination is made as to whether the vibrations experienced by the storage device exceed a threshold (745). If the vibrations do not exceed the threshold, then the process returns to block 730 for ongoing local processing of vibration cancellation. If the vibrations exceed the threshold, a vibration warning is transmitted to a coordinating node (750). A fault condition is diagnosed (755). A fault condition warning is transmitted (755). Coordinating information from a coordinating node is received (760).

Coordinating information from a coordinating node will vary between embodiments. In some embodiments, a model of counter-vibration movement calculation may be changed on orders from the coordinating node. In other embodiments, warning signals may be propagated to nearby coordinating nodes or to a server using a particular storage device. In some embodiments, a disk or a rack may be forced to power-down to prevent damage. Likewise, control of particular counter-vibration actuators or of storage device components such as fans may be shifted from a coordinator node to a storage device, or vice versa. A storage device or coordinator node may likewise apply adaptive learning techniques to modify models of vibration attenuation used to calculate counter-vibration movements.

Figure 8:
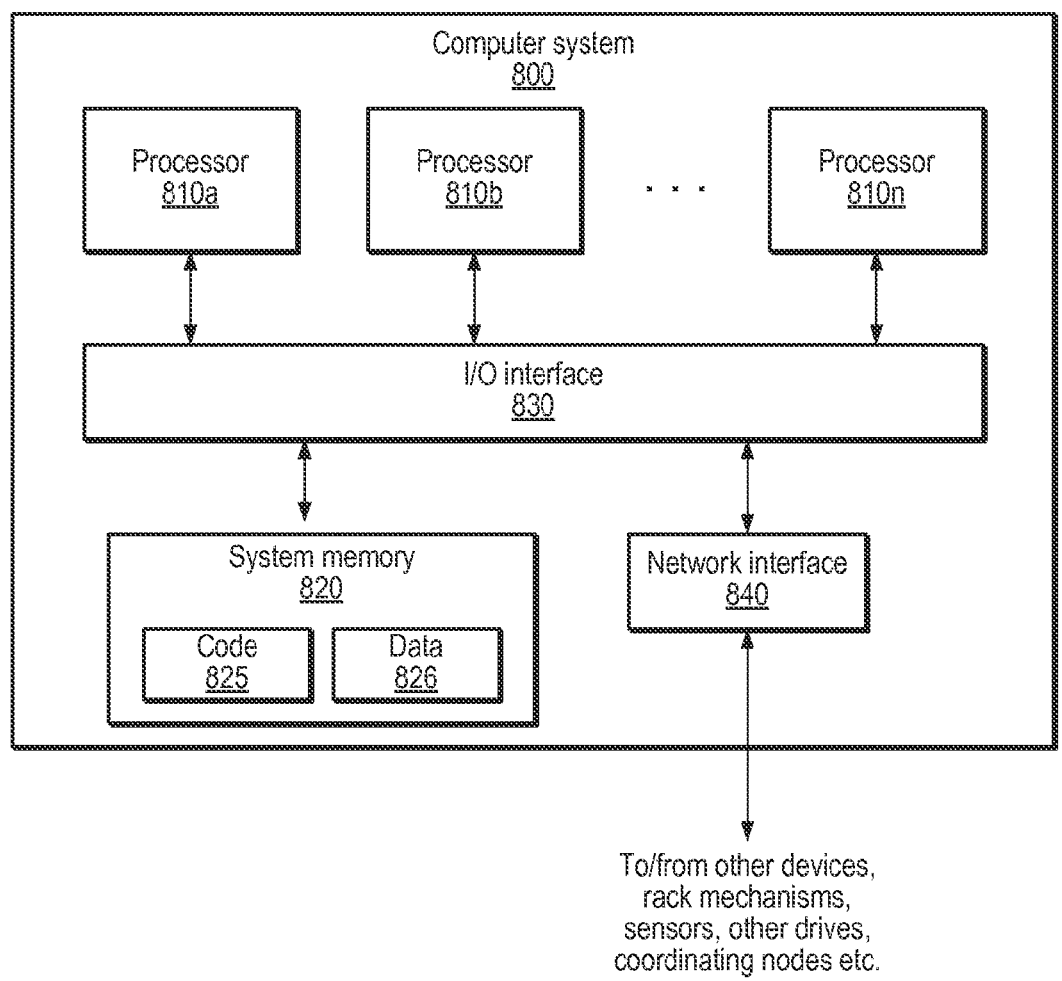
FIG. 8 is a block diagram illustrating an example computer system that may be used in at least some embodiments.

In at least some embodiments, a system that implements one or more components of vibration cancellation techniques as described herein may include a general-purpose computer system, used, for example as a coordinator node, that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system in a robotic induction technique and/or in a non-linear, unit-level materials handling system that implements the robotic induction technique, are shown stored within system memory 820 as code 825 and data 826.

In at least some embodiments, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, communications devices, control mechanisms, readers, scanners and so on that are components of a robotic induction technique and/or of a non-linear, unit-level materials handling system that implements the robotic induction technique. The communications channels may include, but are not limited to conventional and mobile telephone and text messaging communications channels. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7B for implementing a control system for, or possibly other components of, a vibration cancellation technique and/or system that implements the vibration cancellation technique. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 800 via I/O interface 830. A computer-accessible medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the example embodiments portrayed below are discussed in terms of electromagnetic hard disk drive storage devices, one of skill in the art will readily realize in light of having read the present disclosure that the vibration cancellation techniques, systems, and devices disclosed herein are applicable to a wide range of magnetic, electromechanical, and optical storage devices, as well as other electrical storage devices that exhibit vibration sensitivity. The disclosure included herein is intended to provide non-limiting examples of vibration cancellation techniques, systems, and devices that are broadly applicable to storage devices employing moving mechanical parts or electrical storage devices, such as RAM drives. Unless otherwise explicitly limited by the claims included below, the foregoing disclosure is intended to apply broadly to storage devices housing storage media, without regard to the type of media or configuration of media, whether existing at the time of this disclosure or subsequently created.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage system, the storage system comprising:
   one or more storage disks mounted within a housing of a storage device;
   one or more heads, mounted within the housing, for reading data from or writing data to respective ones of the one or more storage disks;
   one or more vibration detectors associated with the storage device, wherein at least one of the one or more vibration detectors comprises a microphone;
   one or more counter-vibration actuators associated with the storage device, wherein at least one of the one or more counter-vibration actuators comprises a sound emitting device;
   one or more processors, wherein the one or more processors are configured to
      collect vibration data from the one or more vibration detectors, wherein the vibration data represents vibrations experienced by the storage device, and wherein at least some of the vibration data is collected from the microphone,
      in response the vibration data from the one or more vibration detectors, calculate one or more movements for respective ones of the one or more counter-vibration actuators to at least partially cancel of the vibrations experienced by the storage device, and
      cause the one or more counter-vibration actuators to perform the respective one or more movements including to cause the sound emitting device to emit sounds.

2. The storage system of claim 1, wherein
   at least one of the one or more vibration detectors is mounted external to the housing;

at least one of the one or more counter-vibration actuators is mounted external to the housing;

the one or more processors is further configured to
receive external vibration data from the at least one of the one or more vibration detectors, wherein the external vibration data represents external vibrations generated by a vibration source external to the storage device;
in response to the external vibration data from the at least one of the one or more vibration detectors, calculate one or more movements for the at least one of the one or more counter-vibration actuators to at least partially cancel of the external vibrations generated by the vibration source external to the storage device; and
cause the at least one of the one or more counter-vibration actuators to perform the one or more movements.

3. The storage system of claim 1, wherein
at least one of the one or more vibration detectors is mounted internal to the housing;
at least one of the one or more counter-vibration actuators is mounted internal to the housing;
the one or more processors is further configured to
receive internal vibration data from the at least one of the one or more vibration detectors, wherein the internal vibration data represents internal vibrations generated by a component of the storage device;
in response to the internal vibration data from the at least one of the one or more vibration detectors, calculate one or more movements for the at least one of the one or more counter-vibration actuators to at least partially cancel of the internal vibrations generated by the component; and
cause the at least one of the one or more counter-vibration actuators to perform the one or more movements.

4. The storage system of claim 1, further comprising
a mounting component of the storage device, wherein
the mounting component of the storage device comprises at least one of the one or more counter-vibration actuators.

5. The storage system of claim 1, further comprising
a mounting device, wherein
the mounting device comprises at least one of the one or more vibration detectors.

6. The storage system of claim 1, wherein at least one of the one or more processors is external to the storage device.

7. The storage system of claim 1, wherein the one of the one or more processors is internal to the storage device.

8. A storage device, the storage device comprising:
a storage medium mounted within a housing of the storage device;
one or more moving components, mounted within the housing, for use in accessing the storage medium;
one or more vibration detectors, wherein at least one of the one or more vibration detectors comprises an accelerometer;
a counter-vibration actuator configured to perform one or more movements calculated to at least partially cancel vibrations experienced by the storage device; and
one or more processors, wherein the one or more processors are configured to
collect vibration data from the one or more vibration detectors, wherein the vibration data represents vibrations experienced by the storage device, and wherein at least some of the vibration data is collected from the accelerometer and represents vibrations below audible frequency,
in response the vibration data from the one or more vibration detectors, calculate one or more movements for respective ones of the one or more counter-vibration actuators to at least partially cancel of the vibrations experienced by the storage device, and
cause the one or more counter-vibration actuators to perform the respective one or more movements to cause counter vibrations below audible frequency.

9. The storage device of claim 8, wherein the counter-vibration actuator configured to perform one or more movements calculated to at least partially cancel vibrations experienced by the storage device further comprises a counter-vibration actuator configured to perform one or more movements calculated to at least partially cancel vibrations expected to be experienced by the storage device based on a design simulation of the storage device.

10. The storage device of claim 8, wherein the counter-vibration actuator configured to perform one or more movements calculated to at least partially cancel vibrations experienced by the storage device further comprises a counter-vibration actuator configured to perform one or more movements calculated to at least partially cancel vibrations expected to be experienced by the storage device based on a design simulation of the storage device including a simulation of a design for the storage device mounted in a simulated rack.

11. The storage device of claim 8, wherein the counter-vibration actuator configured to perform one or more movements calculated to at least partially cancel vibrations experienced by the storage device further comprises a counter-vibration actuator configured to perform one or more movements calculated to at least partially cancel vibrations measured through real-time monitoring of vibrations experienced by the storage device.

12. The storage device of claim 8, wherein the counter-vibration actuator comprises at least one piezoelectric actuator.

13. The storage device of claim 8, wherein the counter-vibration actuators comprises at least one MEMS actuator.

14. The storage device of claim 8, further comprising
a mounting adaptor for affixing the storage device to a rack, wherein
the mounting adapter comprises the counter-vibration actuator.

15. A method for reducing vibrations in a storage device, the method comprising:
collecting vibration data from one or more vibration detectors associated with the storage device, wherein
the vibration data represents vibrations experienced by the storage device;
in response to the vibration data from the one or more vibration detectors, calculating one or more movements for respective ones of one or more counter-vibration actuators to at least partially cancel the vibrations experienced by the storage device, wherein said calculating comprises:
calculating from the vibration data from the one or more vibration detectors a dynamic vibration component of the vibrations experienced by the storage device and a transient set of one or more movements for a subset of the one or more counter-vibration actuators to at least partially cancel of the dynamic vibration component of the vibrations experienced by the storage device;
calculating from the vibration data from the one or more vibration detectors a recurring vibration component of the vibrations experienced by the storage device and a recurring set of one or more movements for another subset of the one or more counter-vibration actuators to at least partially cancel of the recurring vibration component of the vibrations experienced by the storage device; and causing the one or more counter-vibration actuators to perform the one or more movements, wherein said causing comprises:

causing the another subset of the one or more counter-vibration actuators to perform the recurring set of one or more movements; and causing the subset of the one or more counter-vibration actuators to perform the transient set of one or more movements.

16. The method of claim 15, further comprising
calculating a design-specific static vibration component; and
causing at least one of the one or more counter-vibration actuators to perform one or more movements calculated to at least partially cancel the design-specific static vibration component.

17. The method of claim 15, further comprising
receiving at the one or more processors position data from one or more heads;
calculating a position error signal for at least one of the one or more heads based on the position data;
in response to the position error signal exceeding a threshold value, calculating a new set of one or more movements for at least one of the one or more counter-vibration actuators to at least partially cancel of the vibrations experienced by the storage device, and
causing the at least one of the one or more counter-vibration actuators to perform new set of one or more movements.

18. The method of claim 17, further comprising
storing the position error signal;
in response to performance of the new set of one or more movements, calculating a new position error signal for the at least one of the one or more heads based on subsequent position data; and
calculating a comparison of the position error signal to the new position error signal.

19. The method of claim 15, further comprising
calculating a design-specific static vibration component associated with a particular mounting configuration; and
programming the storage device to cause at least one of the one or more counter-vibration actuators to perform one or more movements calculated to at least partially cancel the design-specific static vibration component.

20. The method of claim 15, wherein,
the collecting vibration data from one or more vibration detectors associated with the storage device further comprises collecting sound data from a microphone; and
the causing the one or more counter-vibration actuators to perform the respective one or more movements further comprises causing a sound emitting device to emit sounds.

21. The method of claim 15, wherein,
the collecting vibration data from the one or more vibration detectors associated with the storage device further comprises collecting from an accelerometer vibration data representing vibrations below audible frequency; and
the causing the one or more counter-vibration actuators to perform the respective one or more movements further comprises causing counter vibrations below audible frequency.

22. A non-transitory computer-accessible storage medium storing program instructions computer-executable to implement a storage device vibration reduction system operable to:
collect vibration data from one or more vibration detectors associated with a storage device, wherein
the vibration data represents vibrations experienced by the storage device;
in response to the vibration data from the one or more vibration detectors, calculate one or more movements for respective ones of one or more counter-vibration actuators to at least partially cancel the vibrations experienced by the storage device, wherein the program instructions computer-executable to calculate the one or more movements for respective ones of one or more counter-vibration actuators to at least partially cancel of the vibrations experienced by the storage device are further computer-executable to receive coordinating information from a coordinating node; and
cause the one or more counter-vibration actuators to perform the one or more movements.

23. The non-transitory computer-accessible storage medium of claim 22, wherein the program instructions are further computer-executable to:
calculating a design-specific static vibration component associated with a particular mounting configuration comprising a plurality of storage devices with estimated vibration emission signatures; and
programming the storage device to cause at least one of the one or more counter-vibration actuators to perform one or more movements calculated to at least partially cancel the design-specific static vibration component.

24. The non-transitory computer-accessible storage medium of claim 22, wherein the program instructions are further computer-executable to transmit the vibration data to a coordinating node.

25. The non-transitory computer-accessible storage medium of claim 22, wherein the program instructions are further computer-executable to:
compare the vibration data to a threshold; and
responsive to vibration data reaching a threshold, transmit a vibration warning to a coordinating node.

26. The non-transitory computer-accessible storage medium of claim 22, wherein the program instructions computer-executable to compare the vibration data to a threshold are further computer-executable to diagnose a fault condition in the storage device and the program instructions computer-executable to transmit the vibration warning to the coordinating node are further executable to transmit a fault condition warning to the coordinating node.

* * * * *